United States Patent [19]

Martínez-Delgado

[11] 4,343,284
[45] Aug. 10, 1982

[54] ANTI-POLLUTION SYSTEM FOR INTERNAL COMBUSTION AND DIESEL ENGINES

[76] Inventor: Nicolás Martinez-Delgado, P.O. Box 37-451, Mexico City, Mexico

[21] Appl. No.: 128,824

[22] Filed: Mar. 10, 1980

[51] Int. Cl.³ .......................................... F02M 25/06
[52] U.S. Cl. ................................. 123/568; 123/25 E; 123/25 F; 123/25 H; 123/569; 123/570
[58] Field of Search ................. 123/25 E, 25 F, 25 R, 123/25 H, 568, 569, 570

[56] References Cited

U.S. PATENT DOCUMENTS

| | | | |
|---|---|---|---|
| 1,551,511 | 8/1925 | Futcher | 123/25 E |
| 1,582,241 | 4/1926 | Bolton | 123/25 F |
| 1,981,891 | 11/1934 | Woermann | 123/25 E |
| 3,139,873 | 7/1964 | Gardner | 123/25 X |
| 3,530,842 | 9/1970 | Von Brimer | 123/25 E |
| 3,537,434 | 11/1970 | Herpin | 123/25 E |
| 3,749,376 | 7/1973 | Alm et al. | 123/25 E |
| 3,968,775 | 7/1976 | Harpman | 123/25 F |
| 4,046,119 | 9/1977 | Perry | 123/25 E |
| 4,166,435 | 9/1979 | Kiang | 123/25 F |
| 4,183,338 | 1/1980 | Lindberg | 123/25 E |

FOREIGN PATENT DOCUMENTS

| | | | |
|---|---|---|---|
| 506392 | 9/1951 | Belgium | 123/25 E |
| 2313705 | 3/1973 | Fed. Rep. of Germany | 123/25 E |
| 2407358 | 6/1979 | France | 123/25 F |

*Primary Examiner*—Wendell E. Burns
*Attorney, Agent, or Firm*—LeBlanc, Nolan, Shur & Nies

[57] ABSTRACT

An anti-pollution system for an internal combustion engine wherein a container within which is a body of water has an air injection system including first tubing extending into the container, second tubing connected to extract combustion gases from the engine exhaust system to introduce them into the container, third tubing extending from within the container to the engine intake system to subject the interior of the container to vacuum, and a heater energized from the vehicle ignition system for heating the body of water, so that during engine operation combustion gases are introduced into the container where they are cleansed, enriched with air and passed into the fuel intake system.

4 Claims, 1 Drawing Figure

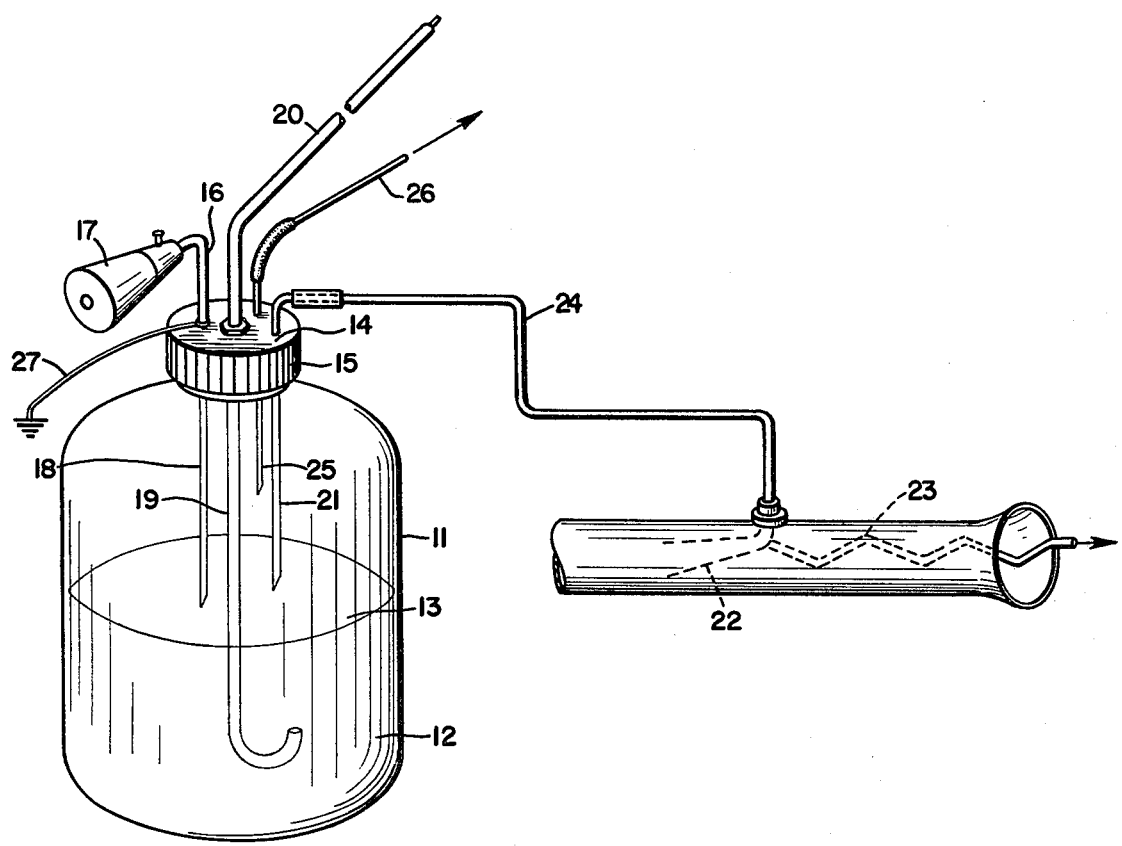

ANTI-POLLUTION SYSTEM FOR INTERNAL COMBUSTION AND DIESEL ENGINES

BRIEF DESCRIPTION OF THE INVENTION

The present anti-pollution system consists of a glass or other transparent container containing a predetermined volume of water, and in the upper aperture of the container is positioned a cap having a metalic base onto which are connected an anti-pollution valve support, an electrothermic resistor and two gas-recycling tubes which are connected at one end with the vehicle's exhaust tube and receiving 70% of the exhaust gases, and on the other end reaching the water level within said container. Said one recycling tube enters said container but does not submerge in water held within said container, connecting at its other end with the engine's general combustion chamber. On said valve support is connected an electrothermic valve similar to the one specified in Mexican Patent No. 139,480 which injects air due the vacuum produced in the vehicle's combustion chamber.

Said electrothermic resistor is connected to the vehicle's battery and to the ignition switch of same, and all the system is grounded as well to prevent formation of electrostatic charges.

BACKGROUND OF THE INVENTION

Air pollution produced by internal combustion engines of various vehicles is currently a well-known problem, which causes atmospheric accumulation of $CO$, $CO_2$ and hydrocarbon derivatives due to gases produced during in combustion of engines as well as during inefficient combustion of same. Trying to solve this problem, regulations have been issued that should lower excessive production of polluting gases, such as lowering speed limits for motorcars, periodic engine tuning and occasionally limiting use of same when the engine is in a very poor working condition.

Devices for filtering combustion gases have also been designed made of carbon and of other materials, but due to their low efficiency have not solved said atmospheric pollution problem.

The advantage of the present invention lies in that exhaust gases are collected by means of a tube and conducted to a container wherein same are cleansed, oxygenated, preheated, enriched with air and reinjected into the combustion engine through the engine's carburetor. This permits that combustion gases collected in the exhaust system be re-cycled before being thrown out into the atmosphere, thus avoiding excessive accumulation of toxic gases in the environment.

The normal cycle for recycling gases according to the invention follows these steps:

The engine's outgoing gases flowing through the exhaust manifold are collected at the muffler by means of a funnel passing said gases into a tube, structure which ends at the water level of the container.

Said gases bubble in the water and are pre-heated by an electrothermic resistor extending from the container's cap to below the water level. This container is under vacuum, since a second tube extends from within the container with, having its opposite end connected to the carburetor of the engine or else to the engine's intake manifold to provide at the fuel intake system for the engine a source of vacuum effective within the container. The vacuum formed in said container is in direct proportion to the vacuum formed in the intake manifold during acceleration.

An air-injection valve is also actuated by the vacuum formed in the intake manifold, providing an adequate amount of air relative to the needs of every engine, and enriching the gas mixture collected in the container. Said air-enriched mixture passes through another tube on to the carburetor or to the chamber of the intake manifold and from there into the engine's combustion chamber, achieving combustion of previously unburned particles.

SUMMARY OF THE INVENTION

The main object of the invention is that of providing a highly efficient anti-pollution system, which will allow re-cycling of combustion gases which are to be cleansed, pre-heated, air-enriched and injected back into the combustion chamber of the engine. Another object of the invention is that of preventing a disproportionate expulsion of toxic gases into the atmosphere such as $CO$, $CO_2$ and hydrocarbon derivatives all of which pollute the atmosphere due to poor combustion in internal combustion and diesel engines.

BRIEF DESCRIPTION OF THE DRAWING

The drawing is a diagrammatic view showing the anti-pollution system, according to an embodiment the invention.

DETAILED DESCRIPTION OF THE INVENTION

The anti-pollution system 10 of the present invention consists of a glass container 11, holding within a predetermined volume of water 12 reaching a predetermined level 13. A cap is providing a metallic base 14 is located on top of container 11.

Base 14 mounts threaded support tube 16 supporting injector-valve 17, and extending down through the base and cap into container 11 as tube 18. And electrothermic resistor 19 extends from base 14 and submerges into water 12, said resistor being connected to the motorcar's battery by means of cable 20. A tube 21 within container 11 extends on the one end to water level 13 and on the other end connects with gas-collecting funnel 22 in the engine exhaust 23 by means of gas-returning tube 24. A second tube 25 extends slightly into container 11 and passes cleansed and enriched gases from container 11 onto the engine carburetor through tube 26.

The complete system is grounded by means of copper wire 27 to prevent undesirable formation of electrostatic charges.

When combustion gases are collected in funnel 22 they are conducted through tube 24 until reaching base 14 where they pass through tube 21 so that said collected gases enter container 11 until reaching water level 13 where said gases are cleansed.

Due to vacuum effective through tube 26 connected to the carburetor, cleansed gases go through tube 26 to enter the mixture in the carburetor. The cleansed gas has been pre-heated by electrothermic resistor 19 and has been enriched by air drawn in through valve 17 actuated by the same vacuum acting on said container.

Resistor 19 is connected to the motorcar's ignition switch with the object of energizing said resistor on starting the engine and of turning it off when said ignition switch is turned off.

I claim:

1. An anti-pollution system for an internal combustion engine having an ignition system, a fuel intake system providing a source of vacuum, and an exhaust gas system; characterized by a container within which is a body of water, a cap structure on said container, an air injection system including first tube means extending through the cap structure into the container, second tube means constructed and arranged to extract combustion gases from said exhaust system and introduce said gases through said cap structure into said container, third tube means extending from within the container through said cap structure to said intake system to subject the interior of the container to vacuum, and means energized from the vehicle ignition system for heating said body of water, whereby during engine operation combustion gases are introduced into the container where they are cleansed, enriched with air and passed into said fuel intake system.

2. An anti-pollution system as defined in claim 1 wherein said air injection system includes a valve mounted on said cap structure.

3. An anti-pollution system as recited in claim 1, wherein said tube means and said heating means are all carried by said cap structure.

4. An anti-pollution system as recited in claim 1, wherein said heating means is an electrothermic resister device mounted on the cap structure and extending into said body of water, said device being electrically connected to said ignition system of the vehicle.

* * * * *